United States Patent [19]

Campbell et al.

[11] 3,846,456

[45] Nov. 5, 1974

[54] ORGANIC COMPOUNDS

[75] Inventors: J. Allan Campbell; John C. Babcock, both of Kalamazoo, Mich.

[73] Assignee: The Upjohn Company, Kalamazoo, Mich.

[22] Filed: Apr. 7, 1965

[21] Appl. No.: 446,395

[52] U.S. Cl........ 260/397.3, 260/397.4, 260/397.5, 260/239.55 C, 260/239.5, 424/243
[51] Int. Cl.................... C07c 169/10, C07c 169/20
[58] Field of Search..... Machine Searched Steroids

[56] References Cited
OTHER PUBLICATIONS

"Steroids" by Campbell et al., Vol. 1, No. 3, March 1963, pages 317–322.

Acta Endocrinologia by Lyster et al., 7/63, pages 399–343.

*Primary Examiner*—Elbert L. Roberts
*Attorney, Agent, or Firm*—Willard L. Cheesman; William A. Hodes

[57] ABSTRACT

The invention relates to novel steroid compounds, more particularly to certain 7α-methyl-4-androstenes, 2α,7α-dimethyl-4-androstenes and their 19-nor-counterparts.

19 Claims, No Drawings

ORGANIC COMPOUNDS

The compounds of the present invention and the processes for their production are illustratively represented by the following sequence of formulae:

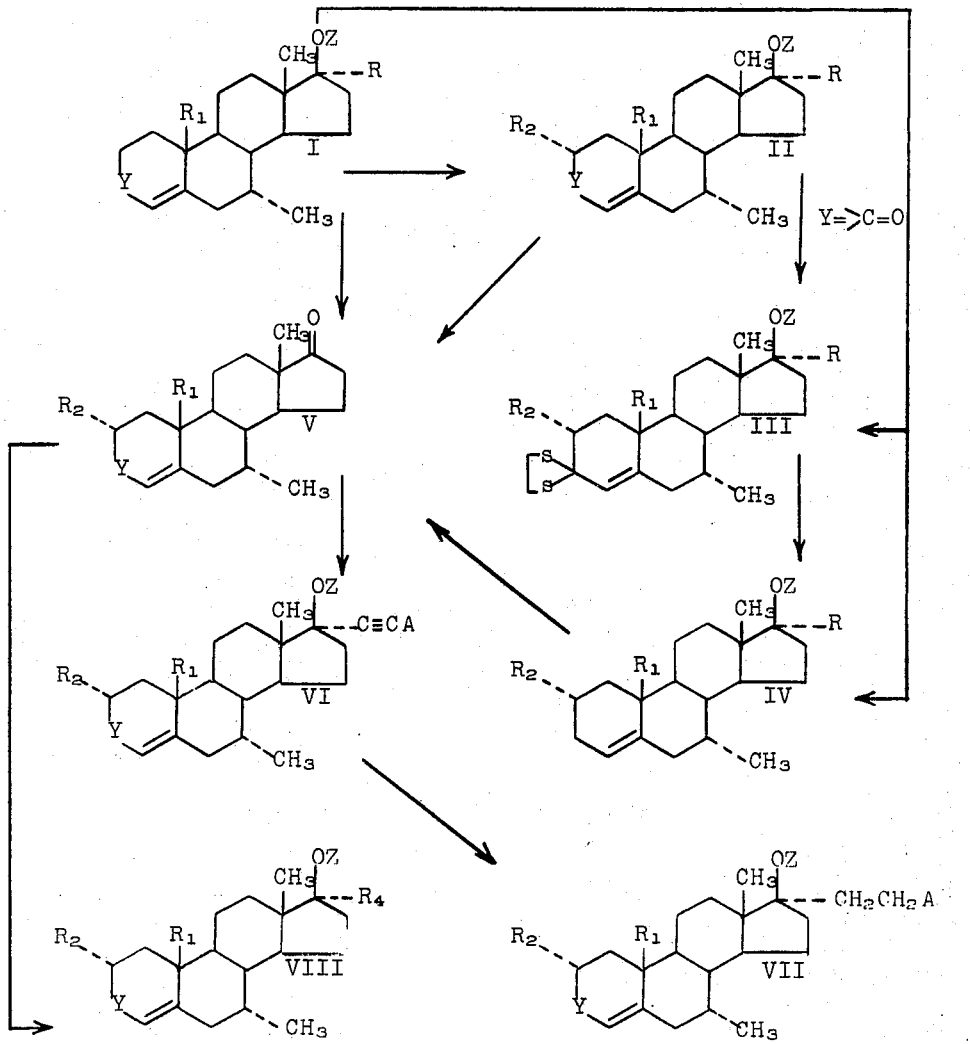

wherein R, $R_1$ and $R_2$ are selected from the group consisting of hydrogen and methyl; $R_4$ is a lower alkyl radical containing from one to twelve carbon atoms, inclusive; Z is selected from the group consisting of hydrogen, lower alkyl of from one to twelve carbon atoms, inclusive, and the lower acyl radical of an organic carboxylic acid containing from one to twelve carbon atoms, inclusive; Y is selected from the group consisting of the methylene radical $$(>CH_2),$$

the carbonyl radical $$(>C=O),$$

$$(>C{<}^{OZ}_{H}) \text{ and } (>C{<}^{OZ}_{H}),$$

Z having the same meanings as above; A is selected from the group consisting of hydrogen, lower alkly of from one to twelve carbon atoms, inclusive, chlorine, bromine and trifluoromethyl; the symbol

represents a thioketal radical of the formula

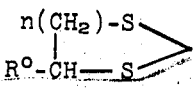

wherein $n$ is selected from the integers one and two and $R^0$ is selected from the group consisting of hydrogen and a lower alkly radical containing from one to six carbon atoms, inclusive. In the Examples relating to 3-thioketals the specific ketal used in the cyclic 3-(ethylene mercaptol) also named as a cyclic 3-(ethylene dithioketal). For brevity, these are referred to as the 3-thioketal.

The compounds of the invention are prepared from the known 7α-methyl-4-androstene starting materials of Formula I, which are synthesized in the manner of Campbell and Babcock (J. Amer. Chem. Soc. 81, 4069). The corresponding 2α-methyl compounds (II) are produced in accordance with the procedures of U.S. Pat. No. 2,923,720.

In order to produce the 3-desoxy compounds of Formula IV, the compounds of Formulae I and II are first converted to their corresponding 3-thioketal derivatives (III) in the manner of J. Amer. Chem. Soc. 76, 1945, namely, by reaction with an alkanedithiol (such as ethanedithiol) in the presence of an organic acid and a strong Lewis acid catalyst (e.g., boron trifluoride etherate); desulfurization is accomplished by hydrogenation of the 3-thioketal group (III) (e.g., with sodium metal in liquid ammonia or with hydrogen in the presence of a catalyst such as Raney nickel) to yield a corresponding 3-desoxy compound (IV), such as 7α-methyl-19-nor-17β-hydroxy-4-androstene (IV).

Oxidation of the compounds of Formulae I, II and IV, e.g., 7α-methyl-19-nor-17β-hydroxy-4-androstene-3-one (I), 2α,7α-dimethyl-17β-hydroxy-4-androstene-3-one (II) and 7α-methyl-19-nor-17β-hydroxy-4-androstene (IV), with oxidizing agents such as chromic acid, sodium dichromate, potassium dichromate, and the like, using procedures known in the art, yields 7α-methyl-19-nor-4-androstene-3,17-dione (V), 2α,7α-dimethyl-4-androstene-3,17-dione (V) and 7α-methyl-19-nor-4-androsten-17-one (V), respectively. The 3-ketones of Formula V can be converted to the corresponding 3β-alcohols by known procedures, e.g., by reduction in cold (about +5°C. to about −5°C.) tetrahydrofuran with lithium aluminum tri-t-butoxyhydride.

The 7α-methyl (and 2α,7α-dimethyl)-3,17-diketo-4-androstenes of Formula V, prior to the formation of their corresponding 17α-alkynyl and haloalkynyl derivatives (VI), must first be converted to the corresponding 3-enamines, 3-ketals, or 3-enol ethers in order to protect the 3-keto function from reduction. The 3-enamine formation can be accomplished in the manner described in U.S. Pat. No. 2,781,343, namely, by reaction with a secondary cyclic alkyleneamine containing from 5 to 7 ring atoms, inclusive, such as pyrrolidine, piperidine, morpholine, and C-alkyl substituted pyrrolidines, piperidines, and morpholines such as 2,4-dimethylpyrrolidine, 3-propylpiperidine, 2-methylpyrrolidine, 3,4-dimethylpyrrolidine, 3-ethylpyrrolidine, 3-isopropylpyrrolidine, 3,3-dimethylpyrrolidine, 2-methylmorpholine, 3-methylmorpholine, and the like. Pyrrolidine is the preferred amine for use in the above reaction.

Advantageously, the 3-enamine is prepared by heating the 7α-methyl (and 2α,7α-dimethyl)-4-androstene-3,17-diones (V) and the secondary cyclic alkyleneamine together in the presence of a suitable solvent, for example, a lower alkanol such as methanol, ethanol, and the like. The desired 3-enamine generally separates from the reaction mixture and is isolated and dried for a short period before being used without further purification in the next stage of the synthesis.

The 3-enamines of 7α-methyl (and 2α,7α-dimethyl)-4-androstene-3,17-diones (V) so obtained are then reacted with an organic alkali metal derivative, for example, the sodium or potassium derivative of the appropriate alkyne. The reaction is carried out preferably in the presence of an anhydrous inert solvent such as dimethylformamide, dimethylsulfoxide, and the like. The 3-enamines of the 7α-methyl (and 2α,7α-dimethyl)-17α-alkynyltestosterones (VI) so obtained are not generally isolated from the reaction mixture but are hydrolyzed in situ to the free 7α-methyl (and 2α,7α-dimethyl)-17α-alkynyltestosterones (VI) by treatment with an aqueous solution of a base such as sodium hydroxide, potassium hydroxide, and the like, after first decomposing the reaction mixture with water, ammonium chloride, and the like.

The 7α-methyl (and 2α,7α-dimethy)-17α-alkynyltestosterones (VI) so obtained can be purified, if desired, by procedures known in the art such as by recrystallization, chromatography and the like.

The 7α-methyl (and 2α,7α-dimethyl)-17α-alkynyltestosterones (VI) of the invention can also be prepared by reacting the 3-enamines of the 7α-methyl (and 2α,7α-dimethyl)-4-androstene-3,17-diones (V), prepared as described above, with the appropriate alkynyl magnesium halide. The reaction is preferably carried out in the presence of a solvent such as diethyl ether, tetrahydrofuran, and the like. Preferably, the Grignard reagent is employed in an excess of the order of 10 moles per mole of the 3-enamine. The 3-enamines of 7α-methyl (and 2α,7α-dimethyl-17α-alkynyltestosterones (VI) so obtained are generally not isolated from the reaction mixture but are hydrolyzed in situ to the free 7α-methyl (and 2α,7α-dimethyl)-17α-alkynyltestosterones (VI) by the method described above.

In converting the 7α-methyl (and 2α,7α-dimethyl)-3,17-diketo-4-androstenes (V) to their corresponding 17α-alkynyl and haloalkynyl derivatives (VI), 3-keto protecting groups in addition to the 3-enamines described above, such as 3-ketals and 3-enol ethers, can be employed. Treatment of a 3-ketal or 3-enol ether of a compound of Formula V with an alkali metal derivative, e.g., an appropriate alkyne or haloalkyne, yields the corresponding 17α-alkynyl derivative, which on hydrolysis gives the corresponding 3-ketone of Formula VI. Methods for the preparation of 3-ketals and 3-enol ethers of a variety of 3-keto compounds of the androstane series, and their subsequent alkynylation or haloalkynylation, is described in detail in J. Chem. Soc. 4995 (1962).

Oxidation of a compound represented by Formula IV, e.g., 7α-methyl-19-nor-17β-hydroxy-4-androstene (IV), with oxidizing agents such as chromic acid, sodium dichromate, potassium dichromate, etc., employing known procedures, yields the corresponding 17-ketone (V), e.g., 7α-methyl-19-nor-4-androsten-17-one (V).

Since the compounds of Formula V, wherein Y is

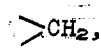

lack as oxygen function at the 3-position no protective group is required to prevent their reaction, and they can be directly converted to the corresponding 17α-alkynyl compounds (VI) by treatment with the sodium or potassium derivative of the appropriate alkyne; e.g., sodium acetylide on reaction with 7α-methyl-19-nor-4-androsten-17-one (V) yields 7α-methyl-19-nor-17β-hydroxy-17α-ethynyl-4-androstene (VI).

The alkynyl compounds of Formula VI can be readily reduced at the 17α-position selectively (e.g., with hydrogen in the presence of a palladium catalyst) to give the corresponding side-chain saturated compound (VII). For example, by employing the foregoing procedure, 7α-methyl-19-nor-17β-hydroxy-17α-ethynyl-4-androstene (VI) and 7α-methyl-19-nor-17β-hydroxy- 17α-ethynyl-4-androsten-3-one (VI) are converted to 7α-methyl-19-nor-17β-hydroxy-17α-ethyl-4-androstene (VII) and 7α-methyl-19-nor-17β-hydroxy-17α-ethyl-4-androsten-3-one (VII), respectively.

The 17-ketones represented by Formula V can be converted to the corresponding 17β-hydroxy-17α-alkyl derivatives (VIII) by treatment with an appropriate alkylating agent such as an appropriate Grignard reagent or alkyl lithium compound. For example, 7α-methyl-19-nor-4-androsten-17-one (V) when heated under reflux in an inert solvent (e.g., benzene-tetrahydrofuran) with methylmagnesium bromide yields 7α,17α-dimethyl-19-nor-17β-hydroxy-4-androstene (VIII). Before converting the compounds of Formula V

to the 17α-alkyl compounds (VIII) by the above procedure, it is necessary to first attach a protecting group at the 3-position, e.g., an enamine; this can be carried out in the manner described hereinbefore for preparing the 17α-alkynyl compounds (VI) from the corresponding 17-ketones (V). The 17α-alkylated -3-enamine produced by the reaction of an appropriate alkylating agent (e.g., a Grignard reagent or alkyl lithium) with a 3-enamine of a compound of Formula V is generally not isolated from the reaction mixture, but is hydrolyzed in situ to the corresponding 7α-methyl (or 2α,7α-dimethyl)-17α-alkyl derivative (VIII) by treatment with an aqueous solution of a base such as sodium hydroxide, potassium hydroxide, etc., after first decomposing the reaction mixture with water, ammonium chloride, and the like. By following the foregoing procedure, 2α,7α-dimethyl-4-androstene-3,17-dione 3-pyrrolidinyl enamine is converted to 2α,7α,17α-trimethyl-17β-hydroxy-4-androsten-3-one (VIII).

Since the compounds of Formula V lack an oxygen function at the 3-position no protective group is required to prevent their reduction, and they can be directly converted to the corresponding 17α-alkynyl compounds (VI) by treatment with the sodium or potassium derivative of the appropriate alkyne; e.g., sodium acetylide on reaction with 7α-methyl-19-nor-4-androsten-17-one (V) yields 7α-methyl-19-nor-17β-hydroxy-17α-ethynyl-4-androstene (VI).

The compounds of Formulae I through VIII of the present invention have anabolic and androgenic activity of improved therapeutic ratio of the former versus the latter. They also exhibit improved solubility properties in oil vehicles, e.g., sesame oil, cottonseed oil and like substances for intramuscular injection, thus permitting more effective doses of steroid to be administered in a practical volume of oil and thereby prolonging the duration of biological effect. They also possess anti-fertility anti-androgenic and anti-estrogenic activities. They also have the ability to reduce the level of cholesterol in the blood and consequently are of therapeutic value in the treatment or prevention of atherosclerosis. The foregoing properties make the new compounds useful in medical and veterinary practice.

The compounds of the invention can be prepared and administered to mammals, birds, humans, and animals, in a wide variety of oral or parenteral dosage forms, singly or in admixture with other coacting compounds. They can be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

Example 1 2α,7α-dimethyl-17β-hydroxy-4-androstene-3-one (2α,7α-dimethyltestosterone) (II)

A solution of 9.96 g. (0.331 mole) of 7α-methyl-17β-hydroxy-4-androstene-3-one (7α-methyltestosterone) (I) (prepared in the manner disclosed in J. Amer. Chem. Soc. 81, 4096) in 150 ml. of t-butyl alcohol was treated with stirring at about 60°C. with 10 ml. of ethyl oxalate followed by 13 ml. of 25% sodium methoxide solution. Heating was stopped and stirring continued for about 20 minutes, while the temperature of the reaction mixture was allowed to decline without external cooling. After the addition of about 120 ml. of anhydrous ether and a further period of about 20 minutes of stirring, the yellow glyoxalate was collected by filtration, washed with ether and dried at about 70°C. in vacuo. The crude glyoxalate weighing 9.17 g. was mixed with 30 g. of potassium carbonate, 30 ml. of methyl iodide and 250 ml. of acetone; the mixture was stirred while heating under gentle reflux for a period of about 24 hours. The reflux condenser was removed and the reaction flask arranged for distillation. After between about 75 and 100 ml. had distilled, the reaction mixture was filtered and the filtrate evaporated to dryness to give 10 g. of solid. This material was dissolved in 125 ml. of methanol, purged with nitrogen and treated with 10 ml. of similarly purged 25% sodium methoxide solution. After about 2 hours at room temperature, 250 ml. of saturated salt solution was added, the mixture extracted with methylene chloride, dried and evaporated to an amber gum. This crude product was purified by chromatography on 350 g. of Florisil (synthetic magnesium silicate). Thirty-five fractions of 550 ml. volume were collected using a gradient from 100% Skellysolve B (hexane hydrocarbons) to 10% acetone-90% Skellysolve B. Fractions 18 to 28 contained 2.68 g. of crystals which after two recrystallizations from a mixture of acetone and Skellysolve B gave pure 2α,7α-dimethyl-17β-hydroxy-4-androstene-3-one (II), melting at 170 to 180°C.; $\lambda_{max}^{alc.}$ 214 mμ; $\epsilon$=15,560; $\eta_{max}^{Nujol}$ 3450, 1655, 1622, 1225 and 1075 $cm.^{-1}$ Anal. Calcd. for $C_{21}H_{32}O_2$: C, 79.70; H, 10.19
Found: C, 79.59; H, 10.49

Following the procedure of Example 1, but substituting for the starting period steroid 7α-methyl-17β-hydroxy-4-androsten-3-one (I), the following representative starting materials:

1.       7α-methyl-19-nor-17β-hydroxy-4-androsten-3-one (I) and
2.       7α-methyl-19-nor-17β-hydroxy-4-androsten-3-one 17-acetate (I), yields, respectively.

1. 2α,7α-dimethyl-19-nor-17β-hydroxy-4-androsten-3-one (II) and
2. 2α,7α-dimethyl-19-nor-17β-hydroxy-4-androsten-3-one 17-acetate (II).

The thus produced 2α,7α-dimethyl-Δ⁴-3-keto compounds (II) of the preceding paragraph can be converted to their Δ⁴-3(α and β)-hydroxy counterparts by employing reduction procedures well known in the steroid art, e.g., by reacting them with sodium borohydride in isopropanol in the manner disclosed in Tetrahedron 15, 193, or with lithium aluminum hydride in accordance with the methods shown in J. Biol. Chem. 175, 217; Helv. Chim. Acta 31, 1822 and 1885; ibid. 32, 265.

Example 2  2α,7α,17α-trimethyl-17β-hydroxy-4-androstene-3-one  (2α,7α,17α-trimethyltestosterone) (II)

To a solution of 50 g. of 7α,17α-dimethyl-17β-hydroxy-4-androsten-3-one (7α,17α-dimethyltestosterone) (I) (prepared as in J. Amer. Chem. Soc. 81, 4069) in 750 ml. of t-butyl alcohol, warmed to 55°C. in a nitrogen atmosphere, 50 ml. of ethyl oxalate and 65 ml. of 25% sodium methoxide solution was added with stirring. Stirring was continued for about 20 minutes after which 750 ml. of ether was added. The mixture was filtered and the solid of yellow glyoxalate dried in a vacuum oven to give 46 g. of crude material. A mixture of the crude glyoxalate, 150 g. of potassium carbonate, 150 ml. of methyl iodide and 1250 ml. of acetone was stirred and heated under reflux for about 24 hours. Approximately 500 ml. of liquid was distilled off and the remaining mixture filtered. the filter cake was washed with acetone and the combined mixture filtered. The cake was washed with additional acetone and the combined filtrate evaporated at reduced pressure to an amber gum which was dissolved in 625 ml. of methanol purged with nitrogen and treated with 50 ml. of 25% sodium methoxide solution. After about 2 hours, 1400 ml. of saturated sodium chloride solution was added, and the mixture extracted with methylene chloride. The extract was dried and the solvent evaporated. The crude gummy product was purified via chromatography on a 2.5 kg. column of Florisil. A mixture composed of 6% of acetone and the remainder Skellysolve B eluted 13.34 g. of crystals, which on recrystallization from acetone-Skellysolve B yielded 11.53 g. of the desired product (II) melting at 158 to 159°C. A portion of this material was recrystallized from the same solvent pair to provide an analytical sample of pure 2α,7α,17α-trimethyl-17β-hydroxy-4-androstene-3-one (II) melting at 158 to 159°C.; $\lambda_{max.}^{alc.}$ 242 m$\mu$; $\epsilon$= 15,500; $\eta^{Nujol}$ 3435, 1665, 1622, 1220, 1166, 1075$^{cm.-1}$ (index I-10,881). Depression of the melting point of the product (II) occurred on mixture with the starting material (I).

Anal. Calcd. for $C_{22}H_{34}O_2$:  C, 79.75; H, 10.37
Found:  C, 79.60; H, 10.48

Following the procedure of Example 2, but substituting for the starting steroid 7α,17α-dimethyl-17β-hydroxy-4-androsten-3-one (I), the following representative starting materials:
 1.   7α,17α-dimethyl-19-nor-17β-hydroxy-4-androsten-3-one (I) and
 2.   7α,17α-dimethyl-19-nor-17β-hydroxy-4-androsten-3-one 17-acetate (I), yields, respectively,
 1.   2α,7α,17α-trimethyl-19-nor-17β-hydroxy-4-androsten-3-one (II) and
 2.   2α,7α,17α-trimethyl-19-nor-17β-hydroxy-4-androsten-3-one 17-acetate (II).

The thus produced 2α,7α,17α-trimethyl-Δ⁴-3-keto compounds (II) of the preceding paragraph, can be converted to the Δ⁴-3 (α and β)-hydroxy counterparts by employing reduction procedures well known in the steroid art, e.g., by reacting them with sodium borohydride in isopropanol in the manner disclosed in Tetrahedron 15, 193, or with lithium aluminum hydride in accordance with the methods shown in J. Biol Chem. 175, 217; Helv. Chim. Acta 31, 1822 and 1885; ibid. 32, 265.

Example 3  7α,17α-dimethyl-17β-hydroxy-4-androsten-3-one 17-acetate (I)

A solution of 10 g. of 7α,17α-dimethyl-17β-hydroxy-4-androsten-3-one (I) in 20 ml. of acetic anhydride and 50 ml. of pyridine was refluxed under nitrogen for about 16 hours. The solvent was removed on a rotary evaporator leaving a brown crystalline residue. It was triturated with Skellysolve B, the crystals washed with Skellysolve B and methanol, and recrystallized from acetone-Skellysolve B to give 5 g. of product melting at 187 to 191°C. Part of the product was recrystallized from acetone Skellysolve B to give an analytical sample of  7α,17α-dimethyl-17β-hydroxy-4-androsten-3-one 17-acetate (I); melting point 190 to 192°C.; $\lambda_{max.}^{alc.}$ 242 m$\mu$ ($\epsilon$=16,750); [α]$_D$ +90° (chloroform).

Anal. Calcd. for $C_{23}H_{34}O_3$:  C, 77.05; H, 9.56
Found:  C, 76.85; H, 9.68

Following the procedure of Example 3 but substituting 2α,7α-dimethyl-17β-hydroxy-4-androsten-3-one (II) and 2α,7α,17α-trimethyl-17β-hydroxy-4-androsten-3-one as starting materials, yields the corresponding 17-acetates (II).

Example 4(a)  2α,7α-dimethyl-17β-hydroxy-4-androstene-3-one 17-acetate (2α,7α-dimethyltestosterone 17-acetate) (II)

A solution of 1 g. of 2α,7α-dimethyl-17β-hydroxy-4-androstene-3-one (II), dissolved in 6 ml. of dried pyridine, is treated with 6 ml. of acetic anhydride. After standing at room temperature for about 17 hours, the reaction mixture is poured into ice water. The mixture is filtered after about 2 hours of standing and the precipitate washed with water and dried in vacuo. Upon recrystallization from a mixture of acetone and hexane, pure 2α,7α-dimethyl-17β-hydroxy-4-androstene-3-one 17-acetate (II) is obtained.

b.   2α,7α,17α-trimethyl-17β-hydroxy-4-androsten-3-one 17-benzoate (2α,7α,17α-trimethyltestosterone 17-benzoate) (II)

A suspension of 0.3 g. of 2α,7α,17α-trimethyl-17β-hydroxy-4-androsten-3-one (II) in 12 ml. of benzene is treated with 0.3 ml. of distilled benzoyl chloride and 0.3 ml. of dry pyridine. The mixture is stirred for about 17 hours at room temperature. After refrigeration the product is collected on a filter, washed with benzene and ether, and dried. Recrystallization from ethyl acetate gives pure 2α,7α,17α-trimethyl-17β-hydroxy-4-androsten-3-one 17-benzoate (II).

In the same manner as given in Example 4 (a and b), the 17β-cyclopentylpropionate, formate, butyrate, isobutyrate, valerate, isovalerate, hexanoate, octanoate, phenylacetate and other like 17-esters of 2α,7α-dimethyl and 2α,7α,17α-trimethyltestosterone (II) are prepared by the reaction of their corresponding 17β-alcohols with the appropriate acid anhydride or halide.

Similarly, following the procedures of Example 4 (a and b) and the paragraph directly above, the following representative 17β-hydroxy compounds are converted to a desired 17-ester named therein:
 1. 2α,7α-dimethyl-19-nor-17β-hydroxy-17α-ethynyl-4-androsten-3-one (II),
 2. 2α,7α-dimethyl-17β-hydroxy-4-androstene (II),
 3.   2α,7α-dimethyl-17β-hydroxy-17α-ethylenyl-4-androstene (II),
 4.   2α,7α,17α-trimethyl-19-nor-17β-hydroxy-17α-ethyl-4-androstene (II), 5. 2α,7α,17α-trimethyl-19-nor-17β-hydroxy-4-androstene-3-one (II) and
6. 2α,7α,17α-trimethyl-17β-hydroxy-4-androstene (II).

Example 5  7α-methyl-19-nor-3β,17β-dihydroxy-4-androstene (I)

To a stirred mixture of 2.5 g. of lithium aluminum tri-t-butoxyhydride in 200 ml. of absolute ether, 1 g. of 7α-methyl-19-nor-17β-hydroxy-4-androsten-3-one (7α-methyl-19-nortestosterone) (I) (prepared as in Belgian Pat. No. 610,385) was added and the mixture stirred for about 16 hours at room temperature. The excess lithium aluminum tri-t-butoxyhydride was destroyed by slow addition of a mixture of 5% acetic acid and 95% water. The ether layer was separated, washed successively with dilute hydrochloric acid, water, dilute sodium hydroxide, additional water and dried. The solvent was removed and the oily residue chromatographed through Florisil. The more polar fractions recovered from the eluates were combined and recrystallized from a mixture of acetone and Skellysolve B to give 250 mg. of 7α-methyl-19-nor-3β,17β-dihydroxy-4-androstene (I) melting at 136 to 139.5°C. (with bubbling).

Anal. Calcd. for $C_{19}H_{30}O_2$(29.43): C, 78.57; H, 10.41
Found: C, 79.21; H, 10.67
79.22   11.06

Example 6  2α, 7α-dimethyl-19-nor-3β,17β-dihydroxy-4-androstene (II)

Following the procedure of Example 5, but substituting 2α,7α-dimethyl-19-nor-17β-hydroxy-4-androsten-3-one (II) as starting steroid, yields 2α,7α-dimethyl-19-nor-3β,17β-dihydroxy-4-androstene (II).

Example 7  7α,17α-dimethyl-3β,17β-dihydroxy-4-androstene (I)

To a stirred mixture 2 g. of lithium aluminum tri-t-butoxyhydride in 20 ml. of tetrahydrofuran, 1 g. of 7α,17α-dimethyl-17β-hydroxy-4-androsten-3-one (7α,17α-dimethyltestosterone) (I) was added and the mixture stirred at room temperature for about 16 hours. On addition of a mixture of 5% acetic acid and 95% water the crude product precipitated. It was recrystallized twice from acetone-Skellysolve B to yield 0.5 g. of pure 7α,17α-dimethyl-3β,17β-dihydroxy-4-androstene (I) having a melting point of 166 to 167°C.; $[\alpha]_D$ + 20° (chloroform).

Anal. Calcd. for $C_{21}H_{34}O_2$: C, 79.19; H, 10.76
Found: C, 79.07; H, 10.67

Example 8  2α,7α,17α-trimethyl-3β,17β-dihydroxy-4-androstene (II)

Following the procedure of Example 7, but substituting 2α,7α,17α-trimethyl-17β-hydroxy-4-androsten-3-one (II) as starting material, yields 2α,7α,17α-trimethyl-3β,17β-dihydroxy-4-androstene (II).

Example 9  7α,17α-dimethyl-19-nor-3β,17β-dihydroxy-4-androstene (7α,17α-dimethylestr-4-ene-3β,17β-diol) (I)

To a solution of 2 g. of 7α,17α-dimethyl-19-nor-17β-hydroxy-4-androsten-3-one (I) (prepared as in Belgian Pat. No. 610,385) in 25 ml. of purified tetrahydrofuran cooled in an ice-salt bath, 4 g. of lithium aluminum tri-t-butoxy hydride was added. The nearly clear solution was stored at −15°C. for about 15 hours; then the excess hydride destroyed and the inorganic salts coagulated by the addition of dilute acetic acid. The organic phase was decanted, dried over magnesium sulfate, filtered and concentrated to dryness. The residue, an oil, became partly crystalline on drying under vacuum at room temperature. It was triturated with Skellysolve B-ether and recrystallized, first from Skellysolve B and then from acetone-water to give 1.05 g. of well-formed crystals. The crystals of 7α,17α-dimethyl-19-nor-3β,17β-dihydroxy-4-androstene (I) on drying at 60°C. still maintained their shape but appeared to be amorphous and softened at 85°C.; $[\alpha]_D$ −4° (chloroform). Infrared and nuclear magnetic resonance spectra were consistent with the structure assigned.

If desired the product can be purified by chromatography and recrystallization.

Following the procedure of Example 9, but substituting 2α,7α,17α-trimethyl-19-nor-17β-hydroxy-4-androsten-3-one (II) as starting material, yields 2α,7α,17α-trimethyl-19-nor-3β,17β-dihydroxy-4-androstene (II).

Example 10  7α-methyl-19-nor-3β,17β-dihydroxy-17α-ethynyl-4-androstene (7α-methyl-17α-ethynyl-4-estrene-3β,17β-diol) (VI)

a. 7α-methyl-19-nor-4-androstene-3,17-dione 3-pyrrolidinyl enamine

To a solution of 10 mg. of 7α-methyl-19-nor-4-androstene-3,17-dione (V) (prepared as in Belgian Pat. No. 610,385) in a small volume of boiling methanol, 1 drop of pyrrolidine was added. The resulting solution was concentrated by evaporation and allowed to cool. The crystalline solid which separated was isolated by filtration, washed with a small volume of methanol and dried. There was thus obtained 7α-methyl-19-nor-4-androstene-3,17-dione 3-pyrrolidinyl enamine in the form of a crystalline solid melting at 151 to 160°C. The ultraviolet absorption spectrum of the compound (in ether solution) exhibited a maximum at 282 mμ ($\epsilon$=23,450). The infrared absorption spectrum (in a mineral oil mull) showed maxima at 1735, 1635, 1600, 1200, 1180, 1155 and 1035 $cm.^{-1}$.

b. 7α-methyl-19-nor-17β-hydroxy-17α-ethynyl-4-androsten-3-one (VI)

A volume of 1 ml. of a 20% by weight suspension of sodium acetylide in xylene was centrifuged and the solid that separated was taken up in 6 ml. of redistilled dimethyl sulfoxide. To the resulting mixture was added the 3-pyrrolidinyl enamine from 0.5 g. of 7α-methyl-19-nor-4-androstene-3,17-dione, prepared as described in (a), above. The mixture so obtained was maintained under an atmosphere of nitrogen for about 5 hours, after which time the excess sodium acetylide was destroyed by dropwise addition of water. About 2 ml. of water and 5 ml. of methanol was added to obtain a clear solution which was then heated on a steam bath for 1 hour. The mixture so obtained was extracted with ether and the ethereal extract washed successively with dilute hydrochloric acid, dilute sodium carbonate, and water, then dried over anhydrous magnesium sulfate. The dried solution was filtered and the filtrate evaporated to dryness. The residue was triturated with a mixture of ether and Skellysolve B and recrystallized twice from a mixture of acetone and Skellysolve B. There was thus obtained 0.161 g. of 7α-methyl-19-nor-17β-hydroxy-17α-ethynyl-4-androsten-3-one (VI) with a melting point of 197 to 199.5°C.; $\lambda_{max.}^{ethanol}$ 240.5 mμ; $\eta_{max.}^{Nujol}$ 3390, 3240, 2100, 1663 and 1623 $cm.^{-1}$.

Anal. Calcd. for $C_{21}H_{28}O_2$: C, 80.72; H, 9.03
Found: C, 80.44; H, 9.05 c. 7α-methyl-19-nor-3β,17β-dihydroxy-17α-ethynyl-4-androstene

A solution of 0.5 g. of 7α-methyl-19-nor-17β-hydroxy-17α-ethynyl-4-androsten-3-one (VI), prepared as described in (b), above, in 5 ml. of tetrahydrofuran (purified by passage through a Woelm neutral alumina column) was cooled in an ice bath and a cooled solution of 1 g. of lithium aluminum tri-t-butoxy-hydride in 5 ml. of tetrahydrofuran added. After standing at room temperature for about 18 hours, a mixture of 5% acetic acid and 95% water was added and the product extracted with ether. The extract was washed with water and dried over magnesium sulfate. The solvent was removed and the crude product chromatographed through Florisil. The oily fractions of the desired 3β-hydroxy compound were combined and crystallized twice from a two-phase mixture of water, Skellysolve B and ether, to yield 380 mg. of hydrated 7α-methyl-19-nor-3β,17β-dihydroxy-17α-ethynyl-4-androstene (VI) having a melting point of 148 to 154°C. Anhydrous material was obtained by drying at 40–100°C. under vacuum.

Anal. Calcd. for $C_{21}H_{30}O_2H_2O$: C, 75.86; H, 9.70
Found: C, 75.82; H, 9.84

Following the procedure of Example 10, but substituting 2α,7α-dimethyl-19-nor-4-androstene-3,17-dione (V) and 2α,7α-dimethyl-4-androstene-3,17-dione (III) for the starting material employed therein, yields, respectively:

a. 2α,7α-dimethyl-19-nor-4-androstene-3,17-dione 3-pyrrolidinyl enamine and 2α,7α-dimethyl-4-androstene-3,17-dione 3-pyrrolidinyl enamine, b. 2α,7α-dimethyl-19-nor-17β-hydroxy-17α-ethynyl-4-androsten-3-one (VI), 2α,7α-dimethyl-17β-hydroxy-17α-ethynyl-4-androsten-3-one (VI), c. 2α,7α-dimethyl-19-nor-3β,17β-dihydroxy-17α-ethynyl-4-androstene (VI) and 2α,7α-dimethyl-3β,17β-dihydroxy-17α-ethynyl-4-androstene (VI).

Example 11 7α-methyl-19-nor-3β,17β-dihydroxy-17α-ethynyl-4-androsten 17-acetate (7α-methyl-17α-ethynyl-4-estrene-3β,17β-diol 17-acetate) (VI)

a. 7α-methyl-19-nor-17β-hydroxy-17α-ethynyl-4-androsten-3-one 17-acetate (VI)

A mixture of 1 g. of 7α-methyl-19-nor-17β-hydroxy-17α-ethynyl-4-androsten-3-one (VI), prepared as described in (b) of Example 10, 20 ml. of acetic anhydride and 1 ml. of pyridine is stirred and heated at 140°C. for about 1 hour under a nitrogen atmosphere. The reaction mixture is then cooled to room temperature and stirred with 100 ml. of water for about 2 hours. The product which separates is isolated by filtration. This product is a mixture of the desired 7α-methyl-19-nor-17β-hydroxy-17α-ethinyl-4-androsten-3-one 17-acetate (VI) and the corresponding 3-enol 3,17-dicaetate; the latter compound is hydrolyzed to the desired compound by heating the mixture under reflux for 1 hour with 100 ml. of methanol containing 2 ml. of concentrated hydrochloric acid. The reaction product so obtained is diluted with water and extracted with ether. The ether extract is dried over anhydrous magnesium sulfate and evaporated to dryness. The residue is dissolved in methylene chloride and chromatographed on a column of magnesium silicate (Florisil). The column is eluted with Skellysolve B containing increasing proportions of acetone and the fractions of the eluate, which are shown by paper chromatogram analysis to contain the desired product, combined and evaporated to dryness. The solid so obtained is recrystallized from aqueous methanol. There is thus obtained 7α-methyl-19-nor-17β-hydroxy-17α-ethinyl-4-androsten-3-one 17-acetate (VI) in the form of a crystalline solid.

Similarly, by reacting 7α-methyl-19-nor-17β-hydroxy-17α-ethynyl-4-androsten-3-one (VI) with the appropriate hydrocarbon carboxylic acid anhydride, for example, at temperatures between about 80°C. and 150°C. using the above procedure there are produced other 17-acylates thereof such as the 17-propionate, 17-butyrate, 17-valerate, 17-hexanoate, 17-trimethylacetate, 17-isobutyrate, 17-isovalerate, 17-cyclohexanecarboxylate, 17-cyclopentylpropionate, 17-phenylpropionate, 17-p-hexyloxypropionate, 17-benzoate, 17-phenylacetate, 17-acrylate, 17-crotonate, 17-undecylenate, 17-propiolate, and 17-cinnamate.

b. 7α-methyl-19-nor-3β,17β-dihydroxy-17α-ethynyl-4-androsten 17-acetate (VI)

To a chilled solution of 2 g. of 7α-methyl-19-nor-17β-hydroxy-17α-ethynyl-4-androsten-3-one 17-acetate- (VI) [prepared as described in (a), immediately above] in 40 ml. of purified tetrahydrofuran, 4 g. of lithium aluminum-tri-t-butoxyhydride was added with stirring under nitrogen. The solution was stored in the refrigerator at −15°C. overnight and dilute acetic acid then added dropwise until the inorganic material was precipitated. The organic phase was decanted, dried over magnesium sulfate and concentrated to a solid foam. It was chromatographed through Florisil and recrystallized from a mixture of acetone and Skellysolve B to give 1.36 g. of 7α-methyl-19-nor-3β,17β-dihydroxy-17α-ethynyl-4-androsten 17-acetate (VI) with a melting point of 131 to 134°C. and rotation $[\alpha]_D$ −35° (chloroform).

Anal. Calcd. for $C_{23}H_{32}O_3$: C, 77.49; H, 9.05
Found: C, 76.86; H, 9.33

Following the procedure of Example 11(b), but substituting as starting material for the 17-acetate of 7α-methyl-19-nor-17β-hydroxy-17α-ethynyl-4-androsten-3-one (VI) employed therein, other corresponding 17-acylates such as the 17-propionate, 17-butyrate, 17-valerate, 17-hexanoate, 17-trimethylacetate, 17-isobutyrate, 17-isovalerate, 17-cyclohexanecarboxylate, 17-cyclopentylpropionate, 17-phenylpropionate, 17-p-hexyloxy-propionate, 17-benzoate, 17-phenylacetate, 17-acrylate, 17-crotonate, 17-undecylenate, 17-propiolate, and 17-cinnamate yields the corresponding 7α-methyl-19-nor-3β,17β-dihydroxy-17α-ethynyl-4-androsten-17-acylate (VI).

Example 12 7α-methyl-19-nor-3β,17β-dihydroxy-17α-ethynyl-4-androstene-3-propionate (7α-methyl-17α-ethynyl-4-estrene-3β,17β-diol 3-propionate) (VI)

A solution of 100 mg. of 7α-methyl-19-nor-3β,17β-dihydroxy-17α-ethynyl-4-androstene (VI) (prepared as described in Example 10) in 0.4 ml. of pyridine and 0.35 ml. of propionic anhydride was kept at room temperature for a period of about 16 hours. Ice and water were added and the product extracted with ether and washed successively with water, dilute hydrochloric acid, water, dilute sodium hydroxide, water and then dried. The solvent was removed and the residue recyrstallized from Skellysolve B to give 70 mg. of 7α-methyl-19-nor-3β,17β-dihydroxy-17α-ethynyl-4-androstene 3-propionate (VI) melting at 98 to 100°C.

Anal. Calcd. for C₂₄H₃₈O₃: C, 76.96; H, 10.22
Found: C, 76.64; H, 9.93

Similarly, by reacting 7α-methyl-19-nor-3β,17β-dihydroxy-17α-ethynyl-4-androstene (VI) with the appropriate hydrocarbon carboxylic acid anhydride using the above procedure, there are produced other 3-acylates thereof such as the 3-butyrate, 3-valerate, 3-hexanoate, 3-trimethylacetate, 3-isobutyrate, 3-isovalerate, 3-cyclohexanecarboxylate, 3-cyclopentylpropionate, 3-phenylpropionate, 3-p-hexyloxypropionate, 3-benzoate, 3-hemisuccinate, 3-phenylacetate, 3-acrylate, 3-crotonate, 3-undecylanate, 3-propiolate, 3-cinnamate, 3-maleate, and 3-citraconate.

Following the procedure of Example 12 and the paragraph directly above, but substituting as starting materials other 3(α and β)-hydroxy-17α-ethynyl steroids (VI) such as 2α,7α-dimethyl-19-nor-3β,17β-dihydroxy-17α-ethynyl-4-androstene (VI), 2α,7α-dimethyl-3β,17β-dihydroxy-17α-ethynyl-4-androstene (VI), 2α,7α-dimethyl-19-nor-3β,17β-dihydroxy-17α-chlorethynyl-4-androstene (VI), 2α,7α-dimethyl-19-nor-3α,17β-dihydroxy-17α-ethynyl-4-androstene (VI), 2α,7α-dimethyl-3α,17β-dihydroxy-17α-ethynyl-4-androstene (VI) and 2α,7α-dimethyl-3α,17β-dihydroxy-17α-chlorethynyl-4-androstene (VI), yields the corresponding 3-acylates thereof.

Example 13 7α-methyl-19-nor-3β,17β-dihydroxy-17α-ethynyl-4-androstene 3,17-diacetate (7α-methyl-17α-ethynyl-4-estrene-3β,17β-diol 3,17-diacetate) (VI)

A solution of 0.42 g. of 7α-methyl-19-nor-3β,17β-dihydroxy-17α-ethynyl-4-androsten 17-acetate (VI) (prepared as described in Example 11) and 0.4 ml. of acetic anhydride in 0.5 ml. of pyridine was kept at room temperature for a period of about 16 hours. Ice and water were added and the resulting precipitate collected, washed with water, dried and recrystallized from aqueous methanol to give 0.4 g. of 7α-methyl-19-nor-3β,17β-dihydroxy-17α-ethynyl-4-androstene 3,17-diacetate (VI) having a melting point of 150 to 151°C. and rotation [α]$_D$ of −75° in chloroform.

Anal. Calcd. for C₂₅H₃₄O₄: C, 75.34; H, 8.60
Found: C, 75.34; H, 8.86

Similarly, by reacting a 7α-methyl-19-nor-3β,17β-dihydroxy-17α-ethynyl-4-androsten 17-acylate (VI) with the appropriate hydrocarbon carboxylic acid anhydride corresponding to the 17-acylate and using the above procedure, there are produced other 3,17-diacylates thereof such as the 3,17-dibutyrate, 3,17-divalerate, 3,17-dihexanoate, 3,17-ditrimethylacetate, 3,17-diisobutyrate, 3,17-diisovalerate, 3,17-dicyclohexane-carboxylate, 3,17-dicyclopentylpropionate, 3,17-diphenylpropionate, 3,17-di-p-hexylpropionate, 3,17-dibenzoate, 3,17-diphenylacetate, 3,17-diacrylate, 3,17-dicrotonate, 3,17-diundecylanate, 3,17-dipropiolate, and 3,17-dicinnamate.

Following the procedure of Example 13 and the paragraph directly above, but substituting as starting materials other 3(α and β)-hydroxy-17-acylate steroids such as 2α,7α-dimethyl-19-nor-3β,17β-dihydroxy-17α-ethynyl-4-androsten 17-acylate (VI), 2α,7α-dimethyl-3β,17β-dihydroxy-17α-ethynyl-4-androsten-17-acylate (VI), 2α,7α-dimethyl-19-nor-3β,17β-dihydroxy-17α-chlorethynyl-4-androsten 17-acylate (VI), 2α,7α-dimethyl-19-nor-3α,17β-dihydroxy-17α-ethynyl-4-androsten 17-acylate (VI), 2α,7α-dimethyl-3α,17β-dihyroxy-17α-ethynyl-4-androsten 17-acylate (VI), and 2α,7α-dimethyl-3α,17β-dihydroxy-17α-chlorethynyl-4-androsten 17-acylate (VI), yields the corresponding 3,17-diacylates thereof.

By reacting a 7α-methyl (or 2α,7α-dimethyl)-19-nor (or 19-methyl)-3 (α or β),17β-dihydroxy-17α-ethynyl-4-androsten 17-acylate (VI) with an appropriate hydrocarbon carboxylic acid anhydride different from the progenitor of the 17-acylate of an aforesaid steroid of Formula VI, and using the above procedures, there are produced mixed 3,17-diacylates thereof such as the 3-acetate 17-butyrate, 3-propionate 17-acetate, 3-butyrate 17-propionate, 3-acetate 17-valerate, 3-valerate 17-hexanoate, 3-valerate 17-trimethylacetate, 3-propionate 17-cyclohexanecarboxylate, 3-acetate 17-cyclohexylpropionate, 3-hemisuccinate 17-acetate, 3-hemisuccinate 17-phenylacetate, 3-acetate 17-acrylate, 3-crotonate 17-phenylacetate, 3-acrylate 17-undecylanate, 3-cinnamate 17-acetate, 3-propionate 17-citraconate, 3-cinnamate 17-propiolate, etc.

Example 14 7α-methyl-19-nor-17β-hydroxy-4-androsten-3-one 3-thioketal (7α-methyl-19-nortestosterone 3-thioketal) (III)

To a solution of 2 g. of 7α-methyl-19-nor-17β-hydroxy-4-androsten-3-one (I) in 6 ml. of acetic acid cooled to about 10°C., 0.7 ml. of ethanedithiol and 0.7 ml. of borontrifluoride etherate was added. After standing at room temperature for about 20 minutes the reaction mixture contained crystalline material. It was diluted to a volume of about 25 ml. with water and ice. The crystals were collected, washed with water and dried to yield 2.75 g. of product, which was recrystallized from a mixture of methanol and methylene chloride to give 2.3 g. of 7α-methyl-19-nor-17β-hydroxy-4-androsten-3-one 3-thioketal (III) having a melting point of 212 to 214°C., rotation [α]$_D$ of +89° (chloroform) and an infrared absorption spectrum consistent with the expected structure of the compound.

Anal. Calcd. for C₂₁H₃₂OS₂: C, 69.17; H, 8.85; S, 17.59
Found: C, 68.89; H, 9.02; S, 17.23

Following the procedure of Example 14 but substituting the following compounds for the starting material employed therein:

a. 7α-methyl-17β-hydroxy-4-androsten-3-one (I),
b. 2α,7α-dimethyl-17β-hydroxy-4-androsten-3-one (II),
c. 2α,7α,17α-trimethyl-17β-hydroxy-4-androsten-3-one (II),
d. 2α,7α-dimethyl-19-nor-17β-hydroxy-4-androsten-3-one (II) and
e. 2α,7α,17α-trimethyl-19-nor-17β-hydroxy-4-androsten-3-one (II), yields, respectively, a. 7α-methyl-17β-hydroxy-4-androsten-3-one 3-thioketal (III),
b. 2α,7α-dimethyl-17β-hydroxy-4-androsten-3-one 3-thioketal (III),
c. 2α,7α,17α-trimethyl-17β-hydroxy-4-androsten-3-one 3-thioketal (III),
d. 2α,7α-dimethyl-19-nor-17β-hydroxy-4-androsten-3-one 3-thioketal (III) and
e. 2α,7α,17α-trimethyl-19-nor-17β-hydroxy-4-androsten-3-one 3-thioketal (III).

Following the procedure of Example 14 and the paragraph directly above, but substituting as starting materials for the 17β-hydroxy compounds disclosed therein, a corresponding 17-acylate thereof, e.g., a 17-acetate or one of those listed at the end of Example 11, or a corresponding 17-alcohol, yields the corresponding 3-thioketal counterpart of the aforesaid acylate or alcohol embraced by Formula II of the flow-sheet.

Example 15  7α-methyl-19-nor-17β-hydroxy-4-androstene (7α-methylestr-4-en-17β-ol) (IV)

To a solution of 1 g. of 7α-methyl-19-nor-17β-hydroxy-4-androsten-3-one 3-thioketal (III), 30 ml. of distilled liquid ammonia, 15 ml. of ether and 5 ml. of tetrahydrofuran, 1 g. of sodium metal was added in small pieces. The steroid went into solution rapidly as the sodium dissolved. The solution was refluxed for about 15 minutes and the blue color was discharged by dropwise addition of absolute ethanol. A fast stream of nitrogen was passed through to aid in evaporating the solvents. After nearly all of the ammonia and other solvents were removed, water was added. The resulting precipitate was collected, washed with water, dried and recrystallized from Skellysolve B to yield 0.6 g. of 7α-methyl-19-nor-17β-hydroxy-4-androstene (IV), having a melting point of 136 to 137°C. and rotation $[\alpha]_D$ of +34° (chloroform).

Anal. Calcd. for $C_{19}H_{30}O$: C, 83.15; H, 11.02
Found: C, 82.97; H, 10.54

Following the procedure of Example 15, but omitting tetrahydrofuran also yields 7α-methyl-19-nor-17β-hydroxy-4-androstene (IV).

Following the procedure of Example 15 but substituting the following compounds for the starting material employed therein:

a. 7α-methyl-17β-hydroxy-4-androsten-3-one 3-thioketal (III),
b. 2α,7α-dimethyl-17β-hydroxy-4-androsten-3-one 3-thioketal (III),
c. 2α,7α,17α-trimethyl-17β-hydroxy-4-androsten-3-one 3-thioketal (III),
d. 2α,7α-dimethyl-19-nor-17β-hydroxy-4-androsten-3-one 3-thioketal (III) and
e. 2α,7α,17α-trimethyl-19-nor-17β-hydroxy-4-androsten-3-one 3-thioketal (III), yields, respectively, a. 7α-methyl-17β-hydroxy-4-androstene (IV),
b. 2α,7α-dimethyl-17β-hydroxy-4-androstene (IV),
c. 2α,7α,17α-trimethyl-17β-hydroxy-4-androstene (IV),
d. 2α,7α-dimethyl-19-nor-17β-hydroxy-4-androstene (IV) and
e. 2α,7α,17α-trimethyl-19-nor-17β-hydroxy-4-androstene IV).

Following the procedure of Example 15 and the two paragraphs immediately preceding the present one but substituting as starting materials for the 17β-hydroxy compounds disclosed therein, a corresponding 17-acylate thereof, e.g., a 17-acetate of one of those listed at the end of Example 11, or a corresponding 17-alcohol, yields the corresponding 3-desoxy counterpart of the aforesaid acylate or alkoxide embraced by Formula II of the flow-sheet.

Example 16  7α-methyl-19-nor-17β-hydroxy-4-androsten 17-acetate (7α-methylestr-4-en-17β-ol acetate) (IV)

A solution of 0.7 g. of 7α-methyl-19-nor-17β-hydroxy-4-androstene (IV) in 1.4 ml. of pyridine and 0.7 ml. of acetic anhydride was kept at room temperature for about 16 hours. Water was slowly added to the reaction mixture and the product extracted with methylene chloride, washed with dilute sodium hydroxide, saturated with a solution of a mixture of sodium chloride and sodium bicarbonate, dried and the solvent removed. The oily residue resisted crystallization so it was chromatographed through a column of Florisil. A yield of 0.32 g. of the pure product, 7α-methyl-19-nor-17β-hydroxy-4-androsten 17-acetate (IV), was obtained.

Anal. Calcd. for $C_{21}H_{32}O_2$: C, 79.69
Found: C, 79.44

Similarly, by reacting 7α-methyl-19-nor-17β-hydroxy-4-androstene (IV) with the appropriate hydrocarbon carboxylic acid anhydride, for example, at temperatures between about room temperature using the above procedure there are produced other 17-acylates thereof such as the 17-propionate, 17-butyrate, 17-valerate, 17-hexanoate, 17-trimethylacetate, 17-isobutyrate, 17-isovalerate, 17-cyclohexanecarboxylate, 17-cyclopentylpropionate, 17-p-hexyloxypropionate, 17-benzoate, 17-hemisuccinate, 17-phenylacetate, 17-phenylpropionate, 17-acrylate, 17-crotonate, 17-undecylenate, 17-propiolate, 17-cinnamate, 17-maleate and 17-citraconate.

Following the procedure of Example 16 and the paragraph directly above, but substituting as starting materials other 3-desoxy-7α-methyl-17β-hydroxy steroids (IV) such as 7α-methyl-17β-hydroxy-4-androstene (IV), 2α,7α-dimethyl-17β-hydroxy-4-androstene (IV), 2α,7α,17α-trimethyl-17β-hydroxy-4-androstene (IV), 2α,7α-dimethyl-19-nor-17β-hydroxy-4-androstene (IV), and 2α,7α,17α-trimethyl-19-nor-17β-hydroxy-4-androstene (IV), yields the corresponding 17-acylates thereof.

Example 17  7α-methyl-19-nor-4-androsten-17-one (7α-methylestr-4-en-17-one) (V)

To a solution of 2.74 g. of 7α-methyl-19-nor-17β-hydroxy-4-androstene (IV) in 30 ml. of acetone cooled in an ice bath, 2.75 ml. of 8N chromium trioxide reagent (Jones reagent) was added dropwise with stirring. After about 10 minutes the mixture was diluted to a volume of about 125 ml. with water. The precipitate was collected, washed with water and dried to yield 2.55 g. of product melting at 140 to 146°C. Recrystallization of 0.55 g. of this material from a mixture of acetone and Skellysolve B gave 0.31 g. of 7α-methyl-19-nor-4-androsten-17-one (V), having a melting point of 157 to 160°C. and an $[\alpha]_D$ of +126° (chloroform).

Anal. Calcd. for $C_{19}H_{28}O$: C, 83.77; H, 10.36
Found: C, 83.85; H, 10.55

Following the procedure of Example 17 but substituting the following compounds for the starting material employed therein:

a. 7α-methyl-17α-hydroxy-4-androstene (IV),
b. 2α,7α-dimethyl-17β-hydroxy-4-androstene (IV),
c. 2α,7α-dimethyl-19-nor-17β-hydroxy-4-androstene (IV),
d. 7α-methyl-17β-hydroxy-4-androsten-3-one (I),
e. 7α-methyl-19-nor-17β-hydroxy-4-androsten-3-one (I),
f. 2α,7α-dimethyl-17β-hydroxy-4-androsten-3-one (II),
g. 2α,7α-dimethyl-19-nor-17β-hydroxy-4-androsten-3-one (II), yields, respectively,
a. 7α-methyl-4-androsten-17-one (V),
b. 2α,7α-dimethyl-4-androsten-17-one (V),
c. 2α,7α-dimethyl-19-nor-4-androsten-17-one (V),
d. 7α-methyl-4-androstene-3,17-dione (V),
e. 7α-methyl-19-nor-4-androstene-3,17-dione (V),
f. 2α,7α-dimethyl-4-androstene-3,17-dione (V) and
g. 2α,7α-dimethyl-19-nor-4-androstene-3,17-dione (V).

To a solution of 1 g. of 7α-methyl-4-androstene-3,17-dione (V) (prepared as in the preceding paragraph) in 25 ml. of purified tetrahydrofuran, cooled between about +5°C. to about −15°C., one molecular equivalent of lithium aluminum tri-t-butoxyhydride is added in small portions with stirring. The reaction mixture is allowed to gradually come to room temperature and any unreacted lithium aluminum tri-t-butoxyhydride destroyed by the addition of dilute acid. The reaction mixture is washed with dilute hydrochloric acid, dried and chromatographed over a Florisil column packed wet with commercial hexanes. The column is eluted with commercial hexanes containing increasing amounts of acetone and those fractions which by thin layer chromatography and ultraviolet absorption show the presence of the desired product are taken to dryness and recrystallized from mixtures of acetone-water and acetone-commercial hexanes to yield 7α-methyl-3β-hydroxy-4-androsten-17-one (V), a crystalline solid.

In like manner, substituting a stoichiometric equivalent amount of
1. 7α-methyl-19-nor-4-androstene-3,17-dione (V),
2. 2α,7α-dimethyl-4-androstene-3,17-dione (V), and
3. 2α,7α-dimethyl-19-nor-4-androstene-3,17-dione (V), yields, respectively,
1. 7α-methyl-19-nor-3β-hydroxy-4-androsten-17-one (V),
2. 2α,7α-dimethyl-3α-hydroxy-4-androsten-17-one (V) and
3. 2α,7α-dimethyl-19-nor-3β-hydroxy-4-androsten-17-one (V).

Example 18 7α-methyl-19-nor-17β-hydroxy-17α-ethynyl-4-androstene (7α-methyl-17α-ethynylestr-4-en-17β-ol) (VI)

A suspension of sodium acetylide (20% in xylene) was centrifuged and the sludge slurried with 10 ml. of dimethyl-sulfoxide. A mixture of 2 g. of 7α-methyl-19-nor-4-androsten-17-one (V) in 10 ml. of dimethylsulfoxide was mixed with the sodium acetylide. After keeping the mixture at room temperature for about a half hour it was stored in the refrigerator for about 16 hours. Water was added to the frozen mixture and the product extracted with water. The extracts were washed with dilute acid, sodium bicarbonate and water, and the solvent removed to give an oily residue. The residue was chromatographed first through a column of Florisil and then through Woelm neutral alumina; recrystallization of the crude product, 7α-methyl-19-nor-17β-hydroxy-17α-ethynyl-4-androstene (VI), from aqueous acetone gave 0.64 g. of clean plates which partially melted at 60°C. and changed to needles having a melting point of 87 to 89°C. The infrared absorption spectrum of the compound supports its proposed structure.

Following the procedure of Example 18 but substituting the following compounds for the starting material employed therein:
a. 7α-methyl-4-androsten-17-one (V),
b. 2α,7α-dimethyl-4-androsten-17-one (V) and
c. 2α,7α-dimethyl-19-nor-4-androsten-17-one (V),
yields, respectively,
a. 7α-methyl-17β-hydroxy-17α-ethynyl-4-androstene (VI),
b. 2α,7α-dimethyl-17β-hydroxy-17α-ethynyl-4-androstene (VI) and
c. 2α,7α-dimethyl-19-nor-17β-hydroxy-17α-ethynyl-4-androstene (VI).

Following the procedure of Example 18 but substituting the following reagents for sodium acetylide:
a. sodium methylacetylide,
b. sodium chloroacetylide,
c. sodium bromoacetylide, and
d. sodium trifluoromethylacetylide, yields, respectively,
a. 7α-methyl-19-nor-17β-hydroxy-17α(1-propynyl)-4-androstene (VI),
b. 7α-methyl-19-nor-17β-hydroxy-17α-chloroethynyl-4-androstene (VI),
c. 7α-methyl-19-nor-17β-hydroxy-17α-bromoethynyl-4-androstene (VI) and
d. 7α-methyl-19-nor-17β-hydroxy-17α-trifluoromethylethynyl-4-androstene (VI).

Following the procedures of Example 18 and the two hereinabove paragraphs yields:
1. 7α-methyl-17β-hydroxy-17α(1-propynyl)-4-androstene (VI),
2. 7α-methyl-17β-hydroxy-17α-chloroethynyl-4-androstene (VI),
3. 7α-methyl-17β-hydroxy-17α-bromoethynyl-4-androstene (VI),
4. 7α-methyl-17β-hydroxy-17α-trifluoromethylethynyl-4-androstene (VI),
5. 2α,7α-dimethyl-17β-hydroxy-17α(1-propynyl)-4-androstene (VI),
6. 2α,7α-dimethyl-17β-hydroxy-17α-chloroethynyl-4-androstene (VI),
7. 2α,7α-dimethyl-17β-hydroxy-17α-bromoethynyl-4-androstene (VI),
8. 2α,7α-dimethyl-17β-hydroxy-17α-trifluoromethylethynyl-4-androstene (VI),
9. 2α,7α-dimethyl-19-nor-17β-hydroxy-17α(1-propynyl)-4-androstene (VI),
10. 2α,7α-dimethyl-19-nor-17β-hydroxy-17α-chloroethynyl-4-androstene (VI),
11. 2α,7α-dimethyl-19-nor-17β-hydroxy-17α-bromoethynyl-4-androstene (VI) and
12. 2α,7α-dimethyl-19-nor-17β-hydroxy-17α-trifluoromethylethynyl-4-androstene (VI).

Following the procedures of Example 18 and the subsequent two paragraphs, but substituting the respective 3-enamine, 3-ketal or 3-enol ether of the following starting materials (prepared from the corresponding 3-ketosteroid, e.g., in the manner disclosed in J. Amer. Chem. Soc. 78, 430, ibid., 80, 4717 and ibid., 75, 650, respectively):

a. 7α-methyl-4-androstene-3,17-dione (V),
    b. 7α-methyl-19-nor-4-androstene-3,17-dione (V),
    c. 2α,7α-dimethyl-4-androstene-3,17-dione (V) and
    d. 2α,7α-dimethyl-19-nor-4-androstene-3,17-dione (V), followed by cleavage of the aforesaid protecting group at the 3-position to restore the 3-keto function (in the manner described in the above-cited publications), yields, respectively, a. (1) 7α-methyl-17β-hydroxy-17α-ethynyl-4-androsten-3-one (VI),
    a. (2) 7α-methyl-17β-hydroxy-17α(1-propynyl)-4-androsten-3-one (VI),
    a. (3) 7α-methyl-17β-hydroxy-17α-chloroethynyl-4-androsten-3-one (VI),
    a. (4) 7α-methyl-17β-hydroxy-17α-bromoethynyl-4-androsten-3-one (VI),
    a. (5) 7α-methyl-17β-hydroxy-17α-trifluoromethylethynyl-4-androsten-3-one (VI),
    b. (1) 7α-methyl-19-nor-17β-hydroxy-17α-ethynyl-4-androsten-3-one (VI),
    b. (2) 7α-methyl-19-nor-17β-hydroxy-17α(1-propynyl-4-androsten-3-one (VI),
    b. (3) 7α-methyl-19-nor-17β-hydroxy-17α-chloroethynyl-4-androsten-3-one (VI),
    b. (4) 7α-methyl-19-nor-17β-hydroxy-17α-bromoethynyl-4-androsten-3-one (VI),
    b. (5) 7α-methyl-19-nor-17β-hydroxy-17α-trifluoromethylethynyl-4-androsten-3-one (VI),
    c. (1) 2α,7α-dimethyl-17β-hydroxy-17α-ethynyl-4-androsten-3-one (VI),
    c. (2) 2α,7α-dimethyl-17β-hydroxy-17α(1-propynyl)-4-androsten-3-one (VI),
    c. (3) 2α,7α-dimethyl-17β-hydroxy-17α-chloroethynyl-4-androsten-3-one (VI),
    c. (4) 2α,7α-dimethyl-17β-hydroxy-17α-bromoethynyl-4-androsten-3-one (VI),
    c. (5) 2α,7α-dimethyl-17β-hydroxy-17α-trifluoromethylethynyl-4-androsten-3-one (VI),
    d. (1) 2α,7α-dimethyl-19-nor-17β-hydroxy-17α-ethynyl-4-androsten-3-one (VI),
    d. (2) 2α,7α-dimethyl-19-nor-17β-hydroxy-17α(1-propynyl)-4-androsten-3-one (VI),
    d. (3) 2α,7α-dimethyl-19-nor-17β-hydroxy-17α-chloroethynyl-4-androsten-3-one (VI),
    d. (4) 2α,7α-dimethyl-19-nor-17β-hydroxy-17α-bromoethynyl-4-androsten-3-one (VI), and
    d. (5) 2α,7α-dimethyl-19-nor-17β-hydroxy-17α-trifluoromethylethynyl-4-androsten-3-one (VI).

Following the procedures of Example 18 and the paragraphs thereafter, and substituting the following starting materials and reagents:

a. 3β-hydroxy-7α-methyl-19-nor-4-androsten-17-one (V) and sodium acetylide,
    b. 3β-hydroxy-7α-methyl-4-androsten-17-one (V) and sodium methylacetylide,
    c. 3β-hydroxy-2α,7α-dimethyl-4-androsten-17-one (V) and sodium chloroacetylide and
    d. 3β-hydroxy-2α,7α-dimethyl-19-nor-4-androsten-17-one and sodium trifluoromethylacetylide, yields, respectively, a. 7α-methyl-19-nor-3β,17β-dihydroxy-17α-ethynyl-4-androstene (VI),
    b. 7α-methyl-3β,17β-dihyroxy-17α(1-propynyl)-4-androstene (VI),
    c. 2α,7α-dimethyl-3β,17β-dihydroxy-17α-chloroethynyl-4-androstene (VI) and
    d. 2α,7α-dimethyl-19-nor-3β,17β-dihydroxy-17α-trifluoromethylethynyl-4-androstene (VI).

Following the procedure of Example 12 and the two paragraphs thereafter, the above 3-hydroxy-17α-alkynyl and haloalkynyl compounds (VI) such as (a), (b) and (d), produced in the manner of the immediately preceding paragraph, are converted to their corresponding 3-acylates.

Example 19 (a) 7α-methyl-19-nor-17β-hydroxy-17α-ethyl-4-androstene (7α-methyl-17α-ethylestr-4-en-17β-ol) (VII)

A catalyst comprising a suspension of 100 mg. of 1% palladium on charcoal in 30 ml. of dioxane (purified by passage through a column of Woelm neutral alumina) was reduced at atmospheric pressure with hydrogen. A solution of 0.4 g. of 7α-methyl-19-nor-17β-hydroxy-17α-ethynyl-4-androstene (VI) (from Example 18) in 5 ml. of dioxane was injected into the reaction flask through a rubber stopper. Hydrogenation was continued until 2 moles of hydrogen (66.5 mls.) were consumed at atmospheric pressure. The catalyst was removed by filtration and the filtrate concentrated to dryness on a rotary evaporator. The oily residue was combined with a like 100 mg. quantity from a previous run and chromatographed through a column of 125 g. of Florisil. The oily band of material was recrystallized from aqueous methanol; on drying at 45°C. it became an oil. Recrystallization from the same solvent gave 270 mg. of crystals of 7α-methyl-19-nor-17β-hydroxy-17α-ethyl-4-androstene (VII) which on drying at room temperature gave an amorphous solid. Infrared absorption and nuclear magnetic resonance spectra were consistent with the expected structure.

Anal. Calcd. for $C_{21}H_{34}O$:   C, 82.38; H, 11.33
                     Found:   C, 81.87; H, 11.09 b. 7α-methyl-19-nor-17β-hydroxy-17α-ethenyl-4-androstene (VII')

Following the procedure of Example 19(a), above, but permitting the hydrogenation described therein to proceed until only 1 mole (33.25 ml.) of hydrogen is consumed instead of 2 moles, yields 7α-methyl-19-nor-17β-hydroxy-17α-ethenyl-4-androstene (VII').

Following the procedure of Example 19(a) but substituting the following compounds for the starting material employed therein:

a. 7α-methyl-17β-hydroxy-17α-ethynyl-4-androstene (VI),
    b. 2α,7α-dimethyl-17β-hydroxy-17α-ethynyl-4-androstene (VI),
    c. 2α,7α-dimethyl-19-nor-17β-hydroxy-17α-ethynyl-4-androstene (VI),
    d. 7α-methyl-17β-hydroxy-17α-ethynyl-4-androsten-3-one (VI),
    e. 7α-methyl-19-nor-17β-hydroxy-17α-ethynyl-4-androsten-3-one (VI),
    f. 2α,7α-dimethyl-17β-hydroxy-17α-ethynyl-4-androsten-3-one (VI) and
    g. 2α,7α-dimethyl-19-nor-17β-hydroxy-17α-ethynyl-4-androsten-3-one (VI), yields the corresponding 17α- ethyl counterparts of (a), (b), (c), (d), (e), (f), and (g) of Formula VII.

Following the procedure of Example 19(a) but substituting the following compounds for the starting material employed therein:

1. 7α-methyl-19-nor-17β-hydroxy-17α(1-propynyl)-4-androstene (VI),
2. 7α-methyl-19-nor-17β-hydroxy-17α-trifluoromethylethynyl-4-androstene (VI),
3. 2α,7α-dimethyl-17β-hydroxy-17α(1-propynyl)-4-androstene (VI),
4. 2α,7α-dimethyl-17β-hydroxy-17α-trifluoromethyl-4-androstene (VI),
5. 2α,7α-dimethyl-19-nor-17β-hydroxy-17α(1-propynyl)-4-androstene (VI),
6. 2α,7α-dimethyl-19-nor-17β-hydroxy-17α-trifluoromethylethynyl-4-androstene (VI),
7. 7α-methyl-17β-hydroxy-17α(1-propynyl)-4-androsten-3-one (VI),
8. 7α-methyl-17β-hydroxy-17α-trifluoromethylethynyl-4-androsten-3-one (VI),
9. 7α-methyl-19-nor-17β-hydroxy-17α(1-propynyl)-4-androsten-3-one (VI),
10. 7α-methyl-19-nor-17β-hydroxy-17α-trifluoromethylethynyl-4-androsten-3-one (VI),
11. 2α,7α-dimethyl-17β-hydroxy-17α(1-propynyl)-4-androsten-3-one (VI),
12. 2α,7α-dimethyl-17β-hydroxy-17α-trifluoromethylethynyl-4-androsten-3-one (VI),
13. 2α,7α-dimethyl-19-nor-17β-hydroxy-17α(1-propynyl)-4-androsten-3-one (VI),
14. 2α,7α-dimethyl-19-nor-17β-hydroxy-17α-trifluoromethylethynyl-4-androsten-3-one (VI) and
15. 2α,7α-dimethyl-19-nor-3β,17β-dihydroxy-17α-ethynyl-4-androstene (VI) [prepared as in Example 10(c)], yields, respectively, 1. 7α-methyl-19-nor-17β-hydroxy-17α(n-propyl)-4-androstene (VII),
2. 7α-methyl-19-nor-17β-hydroxy-17α(3',3',3'-trifluoropropyl)-4-androstene (VII),
3. 2α,7α-dimethyl-17β-hydroxy-17α(n-propyl)-4-androstene (VII),
4. 2α,7α-dimethyl-17β-hydroxy-17α(3',3',3'-trifluoropropyl)-4-androstene (VII),
5. 2α,7α-dimethyl-19-nor-17β-hydroxy-17α(n-propyl)-4-androstene (VII),
6. 2α,7α-dimethyl-19-nor-17β-hydroxy-17α(3',3',3'-trifluoropropyl)-4-androstene (VII),
7. 7α-methyl-17β-hydroxy-17α(n-propyl)-4-androsten-3-one VII),
8. 7α-methyl-17β-hydroxy-17α(3',3',3'-trifluoropropyl)-4-androsten-3-one (VII),
9. 7α-methyl-19-nor-17β-hydroxy-17α(n-propyl)-4-androsten-3-one (VII),
10. 7α-methyl-19-nor-17β-hydroxy-17α(3',3',3'-trifluoropropyl)-4-androsten-3-one (VII),
11. 2α,7α-dimethyl-17β-hydroxy-17α(n-propyl)-4-androsten-3-one (VII),
12. 2α,7α-dimethyl-17β-hydroxy-17α(3',3',3'-trifluoropropyl)-4-androsten-3-one (VII),
13. 2α,7α-dimethyl-19-nor-17β-hydroxy-17α(n-propyl)-4-androsten-3-one (VII),
14. 2α,7α-dimethyl-19-nor-17β-hydroxy-17α(3',3',3'-trifluoropropyl)-4-androsten-3-one (VII) and
15. 2α,7α-dimethyl-19-nor-3β,17β-dihydroxy-17α-ethyl-4-androstene (VII).

Following the procedure of Example 19(b) but substituting the following compounds for the starting material employed therein:

a. 7α-methyl-17β-hydroxy-17α-ethynyl-4-androstene (VI),
b. 2α,7α-dimethyl-17β-hydroxy-17α-ethynyl-4-androstene (VI),
c. 7α-methyl-19-nor-17β-hydroxy-17α-ethynyl-4-androsten-3-one (VI) and
d. 2α,7α-dimethyl-19-nor-17β-hydroxy-17α-ethynyl-4-androsten-3-one (VI), yields the corresponding 17α-ethenyl counterparts of (a), (b), (c), and (d) of Formula VII'.

Following the procedure of Example 19(b) but substituting the following compounds for the starting material employed therein:

1. 7α-methyl-19-nor-17β-hydroxy-17(1-propynyl)-4-androstene (VI),
2. 2α,7α-dimethyl-19-nor-17β-hydroxy-17α-trifluoromethylethynyl-4-androstene (VI),
3. 7α-methyl-17β-hydroxy-17α(1-propynyl)-4-androsten-3-one (VI),
4. 2α,7α-dimethyl-19-nor-17β-hydroxy-17α-trifluoromethylethynyl-4-androsten-3-one (VI) and
5. 2α,7α-dimethyl-19-nor-3β,17β-dihydroxy-17α-ethynyl-4-androstene (VI), yields, respectively, 1. 7α-methyl-19-nor-17β-hydroxy-17α(n-propenyl)-4-androstene (VII'),
2. 2α,7α-dimethyl-19-nor-17β-hydroxy-17α(3',3',3'-trifluoropropenyl)-4-androstene (VII'),
3. 7α-methyl-17β-hydroxy-17α(1-propynyl)-4-androsten-3-one (VII'),
4. 2α,7α-dimethyl-19-nor-17β-hydroxy-17α(3',3',3'-trifluoropropenyl)-4-androsten-3-one (VII') and
5. 2α,7α-dimethyl-19-nor-17β-hydroxy-17α-ethenyl-4-androstene (VII').

Example 20 7α-methyl-19-nor-17β-hydroxy-17α-ethyl-4-androsten-3-one (7α-methyl-17α-ethyl-19-nortestosterone) (VII)

A suspension of 90 mg. of 1% palladium on carbon catalyst in 50 ml. of dioxane (purified as described in Fieser, "Methods of Organic Chemistry," page 368, 2nd edition) was saturated with hydrogen at atmospheric pressure. To the dioxane suspension 300 mg. of 7α-methyl-19-nor-17β-hydroxy-17α-ethynyl-4-androsten-3-one (VI), prepared as in Example 10(b), was added and hydrogenated at atmospheric pressure until two equivalents of hydrogen was consumed. The reaction mixture was filtered through a bed of Celite (diatomaceous earth), the filtrate concentrated to dryness and chromatographed through a 100 g. column of Florisil packed wet with Skellysolve B. Elution by a gradient technique employing between 4 l. of 2% acetone-Skellysolve B and 4 l. of 8% acetone-Skellysolve B, collecting 250 ml. fractions, gave the desired product as an oil in fractions 21 to 30. The oil was crystallized twice from a mixture of Skellysolve B and ether to give 160 mg. of 7α-methyl 19-nor-17β-hydroxy-17α-ethyl-4-androsten-3-one (VII), melting at 132 to 135°C., $\lambda_{max}^{alc.}$ 241 mμ ($\epsilon$=11,200). An analytical sample from a like run melted at 138 to 139°C., $\lambda_{max}^{alc.}$ 241 mμ ($\epsilon$=17,000).

Anal. Calcd. for $C_{21}H_{32}O_2$: C, 79.69; H, 10.19
Found: C, 79.42; H, 10.23

Fractions 13, 14 and 15 were combined and recrystallized from Skellysolve B to give 10 mg. of 7α-methyl-19-nor-17β-hydroxy-17α-ethyl-5β-androstan-3-one melting at 108 to 113°C. The optical rotary dispersion and infrared absorption spectra of the compound confirmed its identity.

In the same manner as shown for preparing the various 17α-alkyl compounds (VII) from their 17α-alkynyl counterparts (VI) appearing after Example 19 by the substitution of appropriate starting materials and by following the procedure of the aforesaid Example, similar substitution of the same 17α-alkynyl starting steriods (VI) and employment of the procedure of Example 20, likewise produces the corresponding 17α-alkyl-$\Delta^4$-compounds (VII) and in addition the corresponding 17α-alkyl-5β-androstane derivatives.

By following the procedure of Example 20, but employing three equivalents of hydrogen instead of two, gives 7α-methyl-19-nor-17β-hydroxy-17α-ethyl-5β-androstan-3-one, predominantly. By following this procedure and employing the starting materials disclosed in the immediately preceding paragraph, the corresponding 17α-alkyl-5β-androstene derivatives will be produced predominantly. The 5β-androstanes so produced exhibit sedative, tranquilizing, and CNS-depressent properties in mammals.

Example 21 7α,17α-dimethyl-19-nor-17β-hydroxy-4-androstene (7α,17α-dimethyl-4-estren-17β-ol) (VIII)

A solution of 2 g. of 7α-methyl-19-nor-4-androsten-17-one (V) (prepared as in Example 17) in 100 ml. of 2 N methylmagnesium bromide in a mixture of equal volumes of benzene and tetrahydrofuran, was heated under reflux for about 18 hours. Most of the solvent was evaporated with a stream of nitrogen. The concentrate was poured into ice-water, acidified with dilute hydrochloric acid and extracted with ether. The extract was washed with sodium bicarbonate solution, water, dried and the solvent removed. The residue was chromatographed through a 150 g. column of Woelm neutral alumina. Unreacted starting material (V) was eluted first. The desired product was then eluted and crystallized from aqueous acetone to give 1.09 g. of 7-α,17α-dimethyl-19-nor-17β-hydroxy-4-androstene (VIII), having a melting point of 126 to 127°C. and [α] + 22°(chloroform). Nuclear magnetic resonance data confirmed the structural assignment.

Anal. Calcd. for $C_{20}H_{32}O$: C, 83.27; H, 11.18
Found: C, 83.16; H, 10.89

Following the procedure of Example 21 but substituting for methylmagnesium bromide, the following Grignard reagents:
a. ethylmagnesium bromide (or chloride),
b. n-propylmagnesium bromide (or chloride),
c. i-propylmagnesium bromide (or chloride),
d. n-butylmagnesium bromide (or chloride) yields, respectively, a. 7α-methyl-17α-ethyl-19-nor-17β-hydroxy-4-androstene (VIII),
b. 7α-methyl-17α-n-propyl-19-nor-17β-hydroxy-4-androstene (VIII),
c. 7α-methyl-17α-i-propyl-19-nor-17β-hydroxy-4-androstene (VIII) and
d. 7α-methyl-17α-n-butyl-19-nor-17β-hydroxy-4-androstene (VIII).

FOllowing the procedures of Example 21 and the paragraph immediately preceding the present one, reaction of the following pairs of starting materials and Grignard reagents:
a. 7α-methyl-19-nor-4-androstene-3,17-dione 3-pyrrolidinyl enamine [prepared as in Example 10(a)] and ethylmagnesium bromide,
b. 7α-methyl-4-androstene-3,17-dione 3-pyrrolidinyl enamine and n-propylmagnesium bromide,
c. 2α,7α-dimethyl-19-nor-4-androstene-3,17-dione 3-pyrrolidinyl enamine and methylmagnesium bromide, and
2α,7α-dimethyl-4-androstene-3,17-dione 3-pyrrolidinyl enamine and methylmagnesium bromide, followed by hydrolyzing the products with a base, yields, respectively,
a. 7α-methyl-17α-ethyl-19-nor-17β-hydroxy-4-androsten-3-one (VIII),
b. 7α-methyl-17α-n-propyl-17β-hydroxy-4-androsten-3-one (VIII),
c. 2α,7α,17α-trimethyl-19-nor-17β-hydroxy-4-androsten-3-one (VIII) and
d. 2α,7α,17α-trimethyl-17β-hydroxy-4-androsten-3-one (VIII).

Following the procedure of the Example 21 and the paragraph thereafter, reaction of the following pairs of starting materials and Grignard reagents:
a. 7α-methyl-4-androsten-17-one (V) and isopropyl magnesium bromide,
b. 7α-methyl-4-androsten-17-one (V) and n-butylmagnesium bromide,
c. 2α,7α-dimethyl-19-nor-4-androsten-17-one (V) and methylmagnesium bromide, and
d. 2α,7α-dimethyl-4-androsten-17-one (V) and ethylmagnesium bromide, yields, respectively,
a. 7α-methyl-17α-isopropyl-17β-hydroxy-4-androstene (VIII),
b. 7α-methyl-17α-n-butyl-17β-hydroxy-4-androstene (VIII),
c. 2α,7α17α-trimethyl-19-nor-17β-hydroxy-4-androstene (VIII) and
d. 2α,17α-dimethyl-17α-ethyl-17β-hydroxy-4-androstene (VIII).

The 7α-methyl (and 2α,7α-dimethyl)-17α-alkyl-17β-hydroxy compounds (VIII) produced in Example 21 and the three paragraphs immediately above, can be converted to their corresponding 17-acylates by following the procedures of Example 16 and the paragraph thereafter.

Following the procedure of Example 9, but substituting the following representative starting materials:
a. 7α-methyl-17α-ethyl-19-nor-17β-hydroxy-4-androsten-3-one (VIII) and
b. 7α-methyl-17α-n-propyl-17β-hydroxy-4-androsten-3-one (VIII), yields, respectively,
a. 7α-methyl-17α-ethyl-19-nor-3β,17β-dihydroxy-4-androstene (VIII) and
b. 7α-methyl-17α-n-propyl-3β,17β-dihydroxy-4-androstene (VIII).

As indicated heretofore, the compounds of this invention are useful in therapy for their anabolic, anti-fertility, anti-androgenic, anti-estrogenic and hypocholesteremic (i.e., reducing blood cholesterol) activities, and particularly in the treatment of atherosclerosis and arteriosclerosis. Administration to mammals, including humans, depends on the particular compound involved, severity of the condition being treated and the individual's response to the medication. In general, a dose of about 5 to 1000 mg. of each of the compounds exemplified in Examples 1 to 21 and embraced within Formulas I to VIII is given one to three times a day, and preferably about 50 to about 500 mg. thereof one to three times a day, in the treatment of conditions incident to the foregoing activities when incorporated in conventional pharmaceutical compositions.

The following examples illustrate the incorporation of the active ingredients of this invention in pharmaceutical formulation.

Example 22 Compressed tablets

A lot of 10,000 compressed tablets, each containing 10 mg. of $7\alpha,17\alpha$-dimethyl-19-nor-$3\beta,17\beta$-dihydroxy-4-androstene is prepared from the following ingredients:

| | |
|---|---|
| $7\alpha,17\alpha$-dimethyl-19-nor-$3\beta,17\beta$-dihydroxy-4-androstene | 100 gm. |
| Dicalcium phosphate | 2500 gm. |
| Methylcellulose, USP (15 cps.) | 65 gm. |
| Talc, bolted | 450 gm. |
| Calcium stearate, fine powder | 35 gm. |

The $7\alpha,17\alpha$-dimethyl-19-nor-$3\beta,17\beta$-dihydroxy-4-androstene and dicalcium phosphate are mixed well, granulated with 7.5% solution of methylcellulose in water, passed through a No. 8 screen and dried at 120°F. The dried granules are passed through a No. 12 screen, mixed thoroughly with the talc and stearate and compressed into tablets.

One tablet is given three times daily in the oral treatment of hypercholesteremia in adult humans.

Example 23 Hard gelatin capsules

A lot of 1000 hard gelatin capsules, each containing 50 mg. of $7\alpha,17\alpha$-dimethyl-19-nor-$17\beta$-hydroxy-4-androstene is prepared from the following ingredients:

| | |
|---|---|
| $7\alpha,17\alpha$-dimethyl-19-nor-$17\beta$-hydroxy-4-androstene, micronized | 50 gm. |
| Lactose | 150 gm. |
| Calcium stearate | 2 gm. |
| Talc | 3 gm. |

The lactose, talc and stearate are mixed well and incorporated into the mixture. The whole is mixed well and filled into two-piece hard gelatin capsules.

The capsules are used in the reduction of cholesterol levels in adult humans at a dose of 3–6 capsules daily.

Example 24 Soft gelatin capsules

A batch of 1000 soft gelatin capsules, each containing 50 mg. of $7\alpha,17\alpha$-dimethyl-19-nor-$3\beta,17\beta$-dihydroxy-4-androstene and corn oil is prepared from the following materials:

| | |
|---|---|
| $7\alpha,17\alpha$-dimethyl-19-nor-$3\beta,17\beta$-dihydroxy-4-androstene | 50 gm. |
| Corn oil | q.s. |

A uniform dispersion of the active ingredient in the corn oil is prepared and the dispersion filled into soft gelatin capsules by conventional means.

One capsule is given twice a day in the treatment of hypercholesteremia in adult humans.

Example 25 Aqueous oral suspension

An aqueous oral suspension containing in each 5 ml. 500 mg. of $7\alpha,17\alpha$-dimethyl-$3\beta,17\beta$-dihydroxy-4-androstene is prepared from the following materials:

| | |
|---|---|
| $7\alpha,17\alpha$-dimethyl-$3\beta,17\beta$-dihydroxy-4-androstene, micronized | 1000 gm. |
| Methylparaben, USP | 7.5 gm. |
| Propylparaben, USP | 2.5 gm. |
| Saccharin sodium | 12.5 gm. |
| Cyclamate sodium | 2.5 gm. |
| Glycerin | 3000 ml. |
| Tragacanth powder | 100 gm. |
| Orange oil flavor | 10 gm. |
| F. D. and C. orange dye | 7.5 gm. |
| Deionized water, q.s. to | 10,000 ml. |

One teaspoonful (5 ml.) three times daily is employed in the treatment of hypercholesteremia in adult humans.

Example 26 Aqueous suspension for injection

A suspending vehicle is prepared from the following materials:

| | |
|---|---|
| Polyethylene glycol 4000 | 30 gm. |
| Potassium chloride | 11.2 gm. |
| Polysorbate 80 | 2 gm. |
| Methylparaben | 1.8 gm. |
| Propylparaben | 0.2 gm. |
| Water for injection q.s. | 1000 ml. |

The parabens are added to a major portion of the water and are dissolved therein by stirring and heating to 65°C. The resulting solution is cooled to room temperature and the remainder of the ingredients are added and dissolved. The balance of the water to make up the required volume is then added and the solution sterilized by filtration. The sterile vehical thus prepared is then mixed with 50 g. of $7\alpha,17\alpha$-dimethyl-19-nor-$17\beta$-hydroxy-4-androstene which has been previously reduced to a particle size less than about 10 microns and sterilized with ethylene oxide gas. The mixture is passed through a sterilized colloid mill and filled under aseptic conditions into sterile containers which are then sealed.

Each milliliter of this suspension contains 50 mg. of $7\alpha,17\alpha$-dimethyl-19-nor-$17\beta$-hydroxy-4-androstene. The suspension is used intramuscularly in 1-ml. doses in the treatment of hypercholesteremia.

We claim:

1. Compounds of the formula

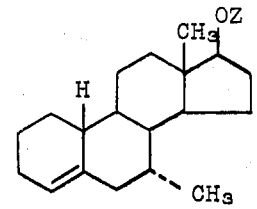

wherein Z is selected from the group consisting of hydrogen and the lower acyl radical of a hydrocarbon carboxylic acid containing from one to twelve carbon atoms, inclusive.

2. 7α-methyl-19-nor-17β-hydroxy-4-androstene.
3. 7α-methyl-19-nor-17β-hydroxy-4-androsten 17-acetate.
4. Compounds of the formula

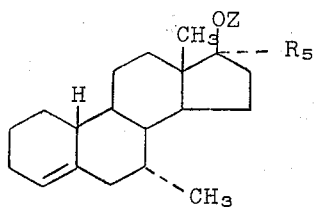

wherein Z is selected from the group consisting of hydrogen and the lower acyl radical of a hydrocarbon carboxylic acid containing from one to twelve carbon atoms, inclusive, and $R_5$ is lower alkyl containing from one to twelve carbon atoms, inclusive.

5. 7α,17α-dimethyl-19-nor-17β-hydroxy-4-androstene.
6. 7α-methyl-19-nor-17β-hydroxy-17α-ethyl-4-androstene.
7. Compounds of the formula

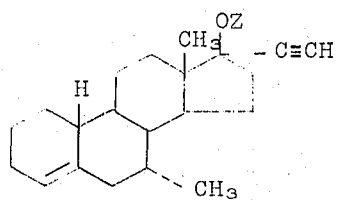

wherein Z is selected from the group consisting of hydrogen and the lower acyl radical of a hydrocarbon carboxylic acid containing from one to twelve carbon atoms, inclusive.

8. 7α-methyl-19-nor-17β-hydroxy-17α-ethynyl-4-androstene.
9. Compounds of the formula

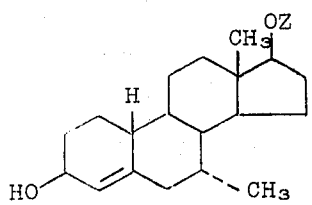

wherein Z is selected from the group consisting of hydrogen and the acyl radical of a hydrocarbon carboxylic acid containing from one to twelve carbons, inclusive.

10. Compounds of the formula

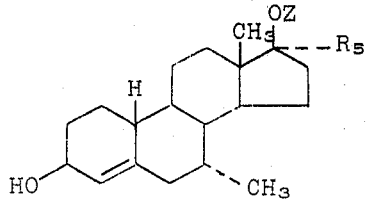

wherein Z is selected from the group consisting of hydrogen and the acyl radical of a hydrocarbon carboxylic acid containing from one to twelve carbon atoms, inclusive and $R_5$ is lower alkyl containing from one to twelve carbon atoms, inclusive.

11. 7α,17α-dimethyl-19-nor-3β,17β-dihydroxy-4-androstene.
12. Compounds of the formula

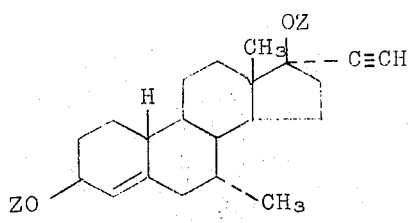

wherein Z is selected from the group consisting of hydrogen and the acyl radical of a hydrocarbon carboxylic acid containing from one to twelve carbon atoms, inclusive.

13. 7α-methyl-19-nor-3β,17β-dihydroxy-17α-ethynyl-4-androstene 3-propionate.
14. 7α-methyl-19-nor-3β,17β-dihydroxy-17α-ethynyl-4-androsten 17-acetate.
15. 7α-methyl-19-nor-17β-hydroxy-17α-ethenyl-4-androstene.
16. 2α,7α-dimethyl-19-nor-17β-hydroxy-17α-ethenyl-4-androsten-3-one.
17. 7α-methyl-19-nor-4-androsten-17-one.
18. A process for the production of a compound of the formula

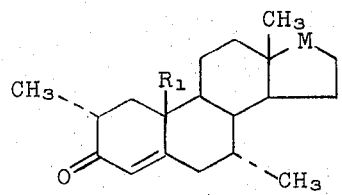

wherein $R_1$ is selected from the group consisting of hydrogen and methyl; M is selected from the group consisting of $$\left(\begin{array}{c}O\\\|\\C\\/\backslash\end{array}\right), \left(\begin{array}{c}OZ\\|\\C---C\equiv CA\\/\backslash\end{array}\right) \text{ and } \left(\begin{array}{c}OZ\\|\\C---R_3\\/\backslash\end{array}\right)$$

wherein A is selected from the group consisting of hydrogen, lower alkyl of from one to twelve carbon atoms, inclusive, chlorine, bromine and trifluoromethyl; $R_3$ is selected from the group consisting of hydrogen, lower alkyl of from one to twelve carbon atoms, inclusive, and alkylene of from one to twelve carbon atoms, inclusive, and Z is selected from the group consisting of hydrogen, and the lower acyl radical of an organic carboxylic acid containing from one to twelve carbon atoms, inclusive, which comprises subjecting to methylation at the 2α-position a corresponding compound of the formula

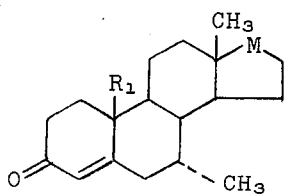

wherein $R_1$ and M have the same meaning as above.

19. A process for the production of a compound of the formula

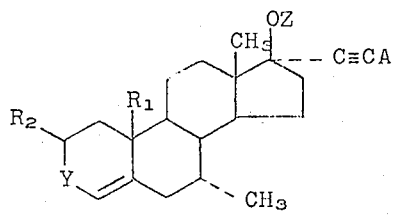

wherein $R_1$ and $R_2$ are selected from the group consisting of hydrogen and methyl; Y is selected from the group consisting of the methylene radical $$(>CH_2),$$

the carbonyl radical $$(>C=O),$$

$$(>C<^{OZ}_{H}) \text{ and } (>C<^{OZ}_{H}),$$

Z being selected from the group consisting of hydrogen and the lower acyl radical of an organic carboxylic acid containing from one to twelve carbon atoms, inclusive; Z at the 17β-position has the same meaning as above; A is selected from the group consisting of hydrogen, lower alkyl of from one to twelve carbon atoms, inclusive, chlorine, bromine, and trifluoromethyl, which comprises: (1) reacting a corresponding compound of the formula

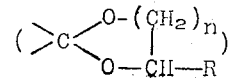

wherein $R_1$ and $R_2$ have the same meaning as above, Y is selected from the group consisting of (a)

$$(>CH_2),$$

(b) an alkylene ketal radical $$(>C<^{O-(CH_2)_n}_{O-CH-R})$$

wherein n is selected from the group consisting of the integers one and two and R is selected from the group consisting of hydrogen and a lower alkyl radical containing from one to six carbon atoms, inclusive,

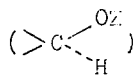

wherein Z has the same meaning as above, and

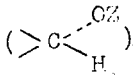

wherein Z has the same meaning as above, with a corresponding alkali metal derivative of a two to four carbon atom alkyne or haloalkyne, and when Y is (b), above, (2) the additional step of hydrolyzing at the 3-position, with a base, a thus produced corresponding 17α-alkynyl or haloalkynyl compound of Formula VI, to yield the corresponding compound wherein Y is $$(>C=O).$$

* * * * *